US012786857B2

(12) United States Patent
Miao et al.

(10) Patent No.: US 12,786,857 B2
(45) Date of Patent: Nov. 3, 2026

(54) INFORMATION OBTAINING AND SENDING METHOD AND APPARATUS, AND TERMINAL DEVICE AND NETWORK DEVICE

(71) Applicant: DATANG MOBILE COMMUNICATIONS EQUIPMENT CO., LTD., Beijing (CN)

(72) Inventors: Jinhua Miao, Beijing (CN); Chunlin Ni, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 336 days.

(21) Appl. No.: 18/552,992

(22) PCT Filed: Mar. 21, 2022

(86) PCT No.: PCT/CN2022/081969
§ 371 (c)(1),
(2) Date: Sep. 28, 2023

(87) PCT Pub. No.: WO2022/206449
PCT Pub. Date: Oct. 6, 2022

(65) Prior Publication Data

US 2024/0172102 A1 May 23, 2024

(30) Foreign Application Priority Data

Mar. 30, 2021 (CN) ......................... 202110341380.5

(51) Int. Cl.
*H04W 48/16* (2009.01)
*H04W 48/18* (2009.01)

(52) U.S. Cl.
CPC ........... *H04W 48/16* (2013.01); *H04W 48/18* (2013.01)

(58) Field of Classification Search
CPC ..... H04W 48/16; H04W 48/18; H04W 48/12; H04W 48/14; H04W 74/006;
(Continued)

(56) References Cited

U.S. PATENT DOCUMENTS 11,212,839 B2 * 12/2021 Zhang .................. H04W 72/23
2018/0124661 A1 5/2018 Tsai
(Continued)

FOREIGN PATENT DOCUMENTS

CN 106572516 A 4/2017
CN 108024297 A 5/2018
(Continued)

OTHER PUBLICATIONS

International Search Report and Written Opinion dated May 26, 2022 issued in corresponding International Patent Application No. PCT/CN2022/081969 (with English translation).
(Continued)

*Primary Examiner* — Abdullahi E Salad
(74) *Attorney, Agent, or Firm* — Harness, Dickey & Pierce, P.L.C.

(57) ABSTRACT

This application provides information obtaining method and apparatus, information sending method and apparatus, a terminal device and a network device, and pertains to the field of communication technology. The information obtaining method is performed by a terminal device, and includes: sending a request message to a network device, the request message being used for requesting information of a target network slice required by the terminal device; and receiving a response message sent by the network device, the response message carrying information corresponding to the target network slice.

15 Claims, 4 Drawing Sheets

(58) Field of Classification Search
CPC ............... H04W 74/0833; H04L 47/74; H04L 41/0806; H04L 41/0893; H04L 41/0895; H04L 5/0053
See application file for complete search history.

(56) References Cited

U.S. PATENT DOCUMENTS

| | | | | |
|---|---|---|---|---|
| 2018/0227871 | A1* | 8/2018 | Singh | H04W 48/18 |
| 2018/0288654 | A1 | 10/2018 | Shih et al. | |
| 2018/0352491 | A1* | 12/2018 | Shih | H04W 36/144 |
| 2019/0230584 | A1 | 7/2019 | Lou et al. | |
| 2019/0289528 | A1 | 9/2019 | Lou et al. | |
| 2020/0015158 | A1* | 1/2020 | So | H04W 8/08 |
| 2020/0022038 | A1* | 1/2020 | Han | H04W 36/0077 |
| 2020/0037214 | A1 | 1/2020 | Jin et al. | |
| 2020/0037234 | A1* | 1/2020 | Bulakci | H04W 76/11 |
| 2020/0367145 | A1* | 11/2020 | Zhang | H04W 48/18 |
| 2021/0068073 | A1 | 3/2021 | Sivavakeesar et al. | |
| 2021/0136570 | A1* | 5/2021 | Paladugu | H04W 12/08 |
| 2021/0377847 | A1 | 12/2021 | Yang et al. | |
| 2022/0124543 | A1* | 4/2022 | Orhan | H04W 28/021 |
| 2022/0124587 | A1* | 4/2022 | Awada | H04W 36/22 |
| 2022/0174625 | A1* | 6/2022 | Xiong | H04J 3/0667 |
| 2022/0353772 | A1* | 11/2022 | Li | H04L 5/0094 |
| 2023/0319528 | A1* | 10/2023 | Pateromichelakis | H04W 4/44 455/420 |
| 2024/0214886 | A1* | 6/2024 | Bulakci | H04W 36/13 |

FOREIGN PATENT DOCUMENTS

| | | | |
|---|---|---|---|
| CN | 108924884 | A | 11/2018 |
| CN | 110463335 | A | 11/2019 |
| CN | 111586667 | A | 8/2020 |
| WO | 2018/137637 | A1 | 8/2018 |

OTHER PUBLICATIONS

Office Action dated Jan. 7, 2023 issued in corresponding Chinese Patent Application No. 202110341380.5 (with English translation).
"Considerations on Mobility Issues of Network Slicing." OPPO, 3GPP TSG-RAN#98, R2-1704070. Hangzhou, China, May 15-19, 2017.
Extended European Search Report issued Jul. 30, 2024 in European Application No. 22778632.4.

* cited by examiner

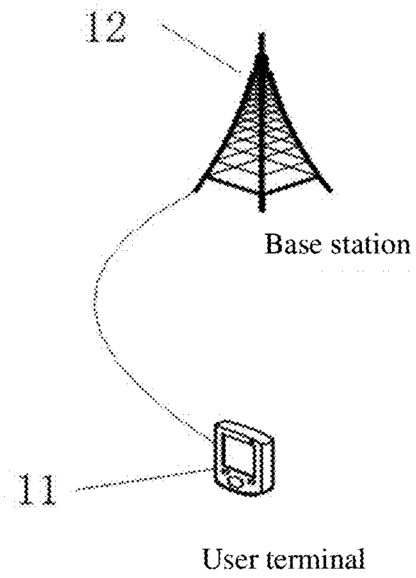
Fig. 1
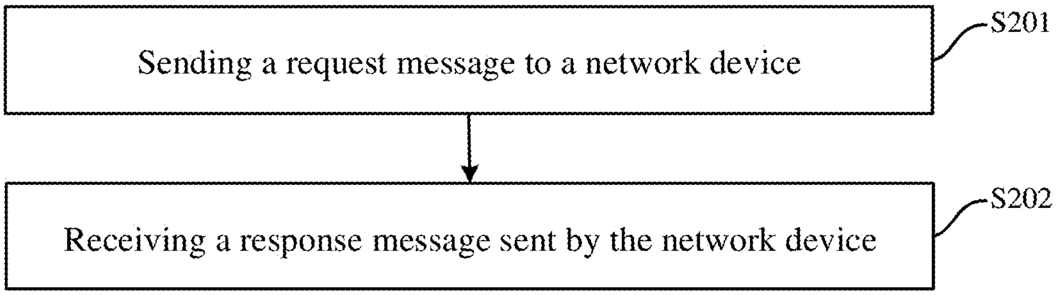
Fig. 2
| | | | | | | | | |
|---|---|---|---|---|---|---|---|---|
| $SST_7$ | $SST_6$ | $SST_5$ | $SST_4$ | $SST_3$ | $SST_2$ | $SST_1$ | $SST_0$ | OCT1 |
Fig. 3

| | | | | | | | | |
|---|---|---|---|---|---|---|---|---|
| $PCI_7$ | $PCI_6$ | $PCI_5$ | $PCI_4$ | $PCI_3$ | $PCI_2$ | $PCI_1$ | $PCI_0$ | OCT1 |

| | | | | | | | | |
|---|---|---|---|---|---|---|---|---|
| $CGI_7$ | $CGI_6$ | $CGI_5$ | $CGI_4$ | $CGI_3$ | $CGI_2$ | $CGI_1$ | $CGI_0$ | OCT1 |

| | | | | | | | | |
|---|---|---|---|---|---|---|---|---|
| $F_7$ | $F_6$ | $F_5$ | $F_4$ | $F_3$ | $F_2$ | $F_1$ | $F_0$ | OCT1 |

INFORMATION OBTAINING AND SENDING METHOD AND APPARATUS, AND TERMINAL DEVICE AND NETWORK DEVICE

CROSS-REFERENCE TO RELATED APPLICATIONS

This application is a U.S. national phase application of PCT Application No. PCT/CN2022/081969 filed on Mar. 21, 2022, which claims priority to the Chinese patent application No. 202110341380.5 filed in China on Mar. 30, 2021, the disclosure of each of which is incorporated herein by reference in their entirety.

TECHNICAL FIELD

The present disclosure relates to the field of communication technology, in particular, relates to an information obtaining method, an information sending method, an information obtaining apparatus, an information sending apparatus, a terminal device and a network device.

BACKGROUND

In related art, User Equipment (UE, also known as terminal) in an inactive or idle state camps in a serving cell, and obtains information of a slicing or slicing group service supported by a current serving cell and/or a neighboring cell by listening to a message broadcasted by the current serving cell.

However, to enable the terminal to obtain valid information of the slicing or the slicing group service, a network side generally broadcasts information of all supported slicing or slicing group services through broadcasting. This will cause a quantity of broadcasted system messages to be significant, and system resources are wasted.

SUMMARY

Embodiments of this application provide an information obtaining method, an information sending method, an information obtaining apparatus, and an information sending apparatus, and a terminal device and a network device, to solve the problem that a quantity of broadcasted system messages is significant and system resources are wasted due to the manner of informing slicing or slicing group service in the related art.

To solve the above technical problem, an embodiment of the present application provides an information obtaining method, performed by a terminal device, including:

- sending a request message to a network device, the request message being used for requesting information of one or more target network slices required by the terminal device; and
- receiving a response message sent by the network device, the response message carrying information corresponding to the target network slice.

In another embodiment of the present application, the request message includes a parameter of the target network slice;

- wherein the parameter of the target network slice includes one or more of following:
- slice/service type SST, slice/service type slice differentiator SST-SD, single network slice selection assistance information NSSAI.

In another embodiment of the present application, the method further includes:

- determining configuration information corresponding to different network slices, wherein the configuration information includes one or more of a preamble, random access time-frequency resource information, and radio resource control RRC information corresponding to each network slice; and
- determining, according to the configuration information corresponding to the different network slices, configuration information corresponding to the target network slice;
- wherein the sending the request message to the network device includes:
- sending the request message to the network device according to the determined configuration information corresponding to the target network slice.

In another embodiment of the present application, in case that the configuration information is the preamble, the sending the request message to the network device according to the determined configuration information corresponding to the target network slice specifically includes:

- sending the preamble corresponding to the target network slice to the network device.

In another embodiment of the present application, in case that the configuration information is the random access time-frequency resource information, the sending the request message to the network device according to the determined configuration information corresponding to the target network slice specifically includes:

- sending the preamble to the network device on the random access time-frequency resource information corresponding to the target network slice;
- or,
- sending the request message to the network device through a random access message MSG3.

In another embodiment of the present application, the sending the request message to the network device through the random access message MSG3 specifically includes:

- writing the request message into a medium access control control element (MAC CE) of the random access message MSG3, and sending the random access message MSG3 including the written request message to the network device.

In another embodiment of the present application, in case that the configuration information is the RRC information, the sending the request message to the network device according to the determined configuration information corresponding to the target network slice includes:

- sending the request message to the network device through the RRC information corresponding to the target network slice.

In another embodiment of the present application, the request message further includes neighboring cell indication information indicating a neighboring cell of the terminal device;

- wherein the neighboring cell indication information includes one or more of:
- a physical cell identifier PCI, a cell global identifier CGI, and frequency information.

In another embodiment of the present application, the frequency information includes one or more of following:

- a carrier frequency supported by the terminal device;
- a first frequency that is greater than or equal to a first threshold and is searchable by the terminal device.

In another embodiment of the present application, the configuration information further includes:

first indication information indicating whether a cell where the terminal device currently resides sends a network slice of the neighboring cell of the terminal device;

wherein the neighboring cell of the terminal device is determined based on the neighboring cell indication information.

In another embodiment of the present application, the information corresponding to the target network slice includes:

second indication information indicating whether a target cell supports the target network slice requested by the terminal device;

wherein the target cell includes at least one of a serving cell of the terminal device or a neighboring cell of the terminal device.

In another embodiment of the present application, the information corresponding to the target network slice further includes:

a configuration parameter of a network slice that is supported by the target cell and is different from the target network slice.

In another embodiment of the present application, in case that the second indication information indicates that the target cell supports the target network slice requested by the terminal device, the information corresponding to the target network slice further includes:

a configuration parameter of the target network slice.

In another embodiment of the present application, after the receiving the response message sent by the network device, the method further includes:

determining, according to the response message, whether to camp in a serving cell, whether to establish an RRC connection, whether to recover an RRC connection establishment, or whether to perform a cell reselection.

An embodiment of the present application further provides an information sending method, performed by a network device, including:

receiving a request message sent by a terminal device, the request message being used for requesting information of one or more target network slices required by the terminal device;

determining information corresponding to the target network slice according to the request message; and sending a response message to the terminal device, the response message carrying the information corresponding to the target network slice.

In another embodiment of the present application, the request message includes a parameter of the target network slice;

wherein the parameter of the target network slice includes one or more of following:

slice/service type SST, slice/service type slice differentiator SST-SD, single network slice selection assistance information NSSAI.

In another embodiment of the present application, before the receiving the request message sent by the terminal device, the method further includes:

sending configuration information corresponding to different network slices to the terminal device;

wherein the configuration information includes one or more of a preamble, random access time-frequency resource information, and radio resource control RRC information corresponding to each network slice.

In another embodiment of the present application, the determining the information corresponding to the target network slice according to the request message includes:

obtaining the target network slice according to the request message;

determining whether a serving cell of the terminal device supports the target network slice; and determining that second indication information indicating whether the serving cell of the terminal device supports the target network slice is the information corresponding to the target network slice.

In another embodiment of the present application, the request message further includes neighboring cell indication information indicating a neighboring cell of the terminal device;

wherein the neighboring cell indication information includes one or more of:

a physical cell identifier PCI, a cell global identifier CGI, and frequency information.

In another embodiment of the present application, the frequency information includes one or more of following:

a carrier frequency supported by the terminal device;

a first frequency that is greater than or equal to a first threshold and is searchable by the terminal device.

In another embodiment of the present application, the determining the information corresponding to the target network slice according to the request message includes:

obtaining the target network slice according to the request message;

determining whether a neighboring cell of the terminal device corresponding to the neighboring cell indication information supports the target network slice; and determining that second indication information indicating whether the neighboring cell of the terminal device supports the target network slice is the information corresponding to the target network slice.

An embodiment of the present application further provides a terminal device, including a memory, a transceiver and a processor, wherein, the memory is configured for storing a computer program; the transceiver is configured for transmitting and receiving data under the control of the processor; and the processor is configured for reading the computer program in the memory to implement following steps:

sending, through the transceiver, a request message to a network device, the request message being used for requesting information of one or more target network slices required by the terminal device; and receiving, through the transceiver, a response message sent by the network device, the response message carrying information corresponding to the target network slice.

In another embodiment of the present application, the request message includes a parameter of the target network slice;

wherein the parameter of the target network slice includes one or more of following:

slice/service type SST, slice/service type slice differentiator SST-SD, single network slice selection assistance information NSSAI.

In another embodiment of the present application, the processor is configured for reading the computer program in the memory to implement following steps:

determining configuration information corresponding to different network slices, wherein the configuration information includes one or more of a preamble, random access time-frequency resource information, and radio resource control RRC information corresponding to each network slice;

determining, according to the configuration information corresponding to the different network slices, configuration information corresponding to the target network slice; and sending, through the transceiver, the request message to the network device according to the determined configuration information corresponding to the target network slice.

In another embodiment of the present application, in case that the configuration information is the preamble, the processor is configured for reading the computer program in the memory to implement following steps:

sending, through the transceiver, the preamble corresponding to the target network slice to the network device.

In another embodiment of the present application, in case that the configuration information is the random access time-frequency resource information, the processor is configured for reading the computer program in the memory to implement following steps:

sending, through the transceiver, the preamble to the network device on the random access time-frequency resource information corresponding to the target network slice;

or, sending, through the transceiver, the request message to the network device through a random access message MSG3.

In another embodiment of the present application, the processor is configured for reading the computer program in the memory to implement following steps:

writing the request message into a medium access control control element (MAC CE) of the random access message MSG3, and sending the random access message MSG3 including the written request message to the network device.

In another embodiment of the present application, in case that the configuration information is the RRC information, the processor is configured for reading the computer program in the memory to implement following step:

sending, through the transceiver, the request message to the network device through the RRC information corresponding to the target network slice.

In another embodiment of the present application, the request message further includes neighboring cell indication information indicating a neighboring cell of the terminal device;

wherein the neighboring cell indication information includes one or more of:

a physical cell identifier PCI, a cell global identifier CGI, and frequency information.

In another embodiment of the present application, the frequency information includes one or more of following:

a carrier frequency supported by the terminal device;

a first frequency that is greater than or equal to a first threshold and is searchable by the terminal device.

In another embodiment of the present application, the configuration information further includes:

first indication information indicating whether a cell where the terminal device currently resides sends a network slice of the neighboring cell of the terminal device;

wherein the neighboring cell of the terminal device is determined based on the neighboring cell indication information.

In another embodiment of the present application, the information corresponding to the target network slice includes:

second indication information indicating whether a target cell supports the target network slice requested by the terminal device;

wherein the target cell includes at least one of a serving cell of the terminal device or a neighboring cell of the terminal device.

In another embodiment of the present application, the information corresponding to the target network slice further includes:

a configuration parameter of a network slice that is supported by the target cell and is different from the target network slice.

In another embodiment of the present application, in case that the second indication information indicates that the target cell supports the target network slice requested by the terminal device, the information corresponding to the target network slice further includes:

a configuration parameter of the target network slice.

In another embodiment of the present application, the processor is configured for reading the computer program in the memory to further implement following step:

judging, according to the response message, whether to camp in a serving cell, whether to establish an RRC connection, whether to recover an RRC connection establishment, or whether to perform a cell reselection.

An embodiment of the present application further provides an information obtaining apparatus, including:

a first sending unit, configured to send a request message to a network device, the request message being used for requesting information of one or more target network slices required by a terminal device; and a first receiving unit, configured to receive a response message sent by the network device, the response message carrying information corresponding to the target network slice.

An embodiment of the present application further provides a network device, including a memory, a transceiver and a processor, wherein, the memory is configured for storing a computer program; the transceiver is configured for transmitting and receiving data under the control of the processor; and the processor is configured for reading the computer program in the memory to implement following steps:

receiving, through the transceiver, a request message sent by a terminal device, the request message being used for requesting information of one or more target network slices required by the terminal device;

determining information corresponding to the target network slice according to the request message; and sending, through the transceiver, a response message to the terminal device, the response message carrying the information corresponding to the target network slice.

In another embodiment of the present application, the request message includes a parameter of the target network slice;

wherein the parameter of the target network slice includes one or more of following:

slice/service type SST, slice/service type slice differentiator SST-SD, single network slice selection assistance information NSSAI.

In another embodiment of the present application, the processor is configured for reading the computer program in the memory to implement following step:

sending, through the transceiver, configuration information corresponding to different network slices to the terminal device;

wherein the configuration information includes one or more of a preamble, random access time-frequency resource information, and radio resource control RRC information corresponding to each network slice.

In another embodiment of the present application, the processor is configured for reading the computer program in the memory to implement following steps:

obtaining the target network slice according to the request message;

determining whether a serving cell of the terminal device supports the target network slice; and determining that second indication information indicating whether the serving cell of the terminal device supports the target network slice is the information corresponding to the target network slice.

In another embodiment of the present application, the request message further includes neighboring cell indication information indicating a neighboring cell of the terminal device;

wherein the neighboring cell indication information includes one or more of:

a physical cell identifier PCI, a cell global identifier CGI, and frequency information.

In another embodiment of the present application, the frequency information includes one or more of following:

a carrier frequency supported by the terminal device;

a first frequency that is greater than or equal to a first threshold and is searchable by the terminal device.

In another embodiment of the present application, the processor is configured for reading the computer program in the memory to implement following steps:

obtaining the target network slice according to the request message;

determining whether a neighboring cell of the terminal device corresponding to the neighboring cell indication information supports the target network slice; and determining that second indication information indicating whether the neighboring cell of the terminal device supports the target network slice is the information corresponding to the target network slice.

An embodiment of the present application further provides an information sending apparatus, including:

a second receiving unit, configured to receive a request message sent by a terminal device, the request message being used for requesting information of one or more target network slices required by the terminal device;

a determining unit, configured to determine information corresponding to the target network slice according to the request message; and a second sending unit, configured to send a response message to the terminal device according to the request message, the response message carrying the information corresponding to the target network slice.

An embodiment of the present application further provides a processor readable storage medium storing a computer program, wherein the computer program is configured to be executed by a processor, to implement the aforementioned methods.

Embodiments of the present application have following beneficial effects.

In the aforementioned solutions, a request message for requesting information of the target network slice required by the terminal device is sent to the network device, such that the network device sends a response message according to the request message, and the network device sends the broadcast message of corresponding slice information only when request is made by the terminal device. In this way, the problem of broadcasting too many messages is solved, and radio resources is saved.

BRIEF DESCRIPTION OF THE DRAWINGS

To describe technical solutions in embodiments of the present application or in related art more clearly, a brief introduction of drawings used in the descriptions of the embodiments or the related art is given below. Obviously, drawings used in the description below merely depict some of the embodiments of the present application. A person of ordinary skill in the art can obtain other drawings based on the described drawings without any creative efforts.

FIG. 1 is a structural diagram of a network system to which embodiments of the present application are applicable;

FIG. 2 is a flow diagram of an information obtaining method according to an embodiment of the present application;

FIG. 3 is a schematic diagram of an MAC CE by which a terminal device requests one or more target network slices of a serving cell;

DETAILED DESCRIPTION

Figures 4, 5, 6, 7:
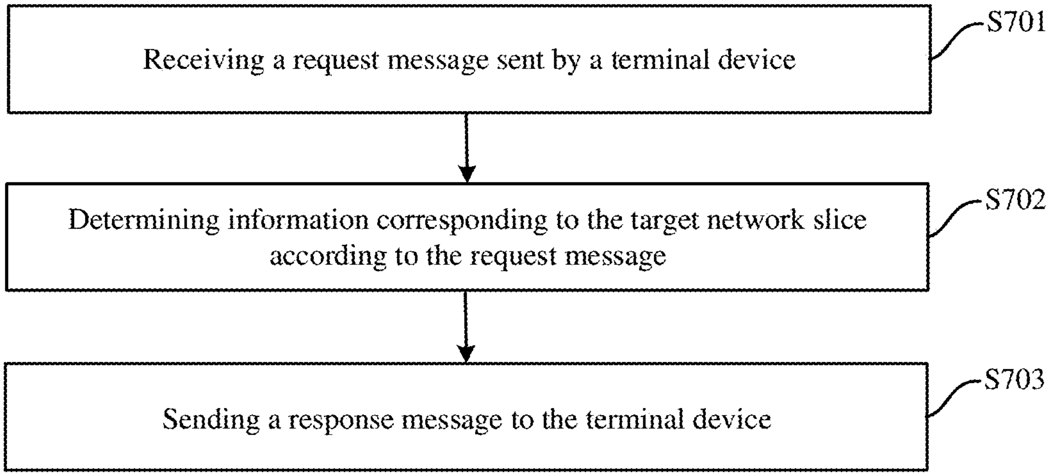
FIG. 4 is a schematic diagram of an MAC CE by which a terminal device requests one or more target network slices of a neighboring cell.
FIG. 5 is another schematic diagram of an MAC CE by which a terminal device requests one or more target network slices of a neighboring cell.
FIG. 6 is yet another schematic diagram of an MAC CE by which a terminal device requests one or more target network slices of a neighboring cell.
FIG. 7 is a flow diagram of an information sending method according to an embodiment of the present application.

The technical solutions in embodiments of the present disclosure are described clearly and completely in conjunction with drawings in the embodiments of the present disclosure. Apparently, the described embodiments are merely a part, rather than all, of the embodiments of the present disclosure. All other embodiments obtained by a person ordinary skilled in the art based on the embodiments of the present disclosure without any creative efforts fall within the protection scope of the present disclosure.

Terms "first", "second" and the like in the description and claims of this application are adopted not to describe a specific sequence or order but to distinguish similar objects. It should be understood that terms used like this may be interchanged under a proper condition for implementation of the embodiments of the present disclosure described here in a sequence apart from those shown or described here. In addition, terms "include" and "have" and any variant thereof are intended to cover nonexclusive inclusions. For example, a process, method, system, product or equipment including a series of steps or units is not limited to those steps or units which are clearly listed, but may include other steps or units which are not clearly listed or intrinsic to the process, the method, the product or the equipment.

The term "and/or" used herein merely refers to an association relationship between objects to be associated and means there are three possibilities. For example, A and/or B may represent: only A exists, both A and B exist, and only B exists. Additionally, the symbol "/" used herein generally represents there is a "or" relationship between the objects to be associated. The term "multiple" used herein refers to two or more, and other quantifiers are similar thereto.

In embodiments of the present application, the word "exemplary" or "for example" or the like is configured for meaning examples, example illustration or illustration. Any embodiment or design solution described as "exemplary" or "for example" in the embodiments of the present application should not be construed as being more preferred or advantageous than other embodiments or design solutions. To be specific, the word "exemplary" or "for example" or the like is intended to present related concepts in a specific manner.

Embodiments of the present application are described hereinafter with reference to accompany drawings. The information obtaining and sending methods and apparatuses, terminal devices and network devices provided in the embodiments of the present application may be applied in a wireless communication system. The wireless communication system may be a system adopting 5th Generation (5G) mobile communication technologies (it is briefly referred to as 5G system hereinafter). A person skilled in the art will understand that the 5G new radio (NR) system is merely used as an example, and is not intended to be limitative.

FIG. 1 is a structural diagram of a network system to which embodiments of the present application are applicable. As shown in FIG. 1, the network system includes a user terminal 11 and a base station 12. The user terminal 11 may be user equipment (UE), for example, may be a terminal side device such as a mobile phone, a tablet personal computer, a laptop computer, a personal digital assistant (PDA), a mobile internet device (MID) or a wearable device. It needs to be noted that the specific type of the user terminal 11 is not limited in the embodiments of the present application. The base station 12 may be a base station of 5G or a later version (for example, a 5G base station (gNB) or a 5G NR NB (Node B)) or a base station in another communication system, or the base station may be referred to as a node B. It needs to be noted that only a 5G base station (gNB) is used as an example in the embodiments of the present disclosure. However, the specific type of the base station 12 is not limited thereto.

Embodiments of this application provide information obtaining and sending methods and apparatuses, and terminal devices and network devices, to solve the problem of large quantity of broadcasted system messages and wasted system resources caused by the manner of informing the slicing or the slicing group service in the related art.

The methods and the apparatuses are based on the same creative concept, and share similar principle to solve the problem. Therefore, for the implementation of one of the methods and the apparatuses, references may be made to the other of the methods and the apparatuses. Repeated description is omitted herein.

As shown in FIG. 2, an embodiment of the present application provides an information obtaining method. The method is performed by a terminal device, and includes a step S201 and a step S202 as follows.

Step S201: sending a request message to a network device;

wherein the request message is configured for requesting information of one or more target network slices required by the terminal device; and it is noted, the one or more target network slices refer to one or more slices, or one or more slice group services.

Step S202: receiving a response message sent by the network device; specifically, the response message carries information corresponding to the one or more target network slices.

It is noted, the response message may be a system message broadcasted by a network device, or a broadcasted message other than a system message.

Specifically, the request message includes one or more parameters of the one or more target network slices; specifically, each parameter of the one or more parameters of the one or more target network slices includes one or more of following A11, A12 and A13.

A11, slice/service type SST; specifically, the SST may be notified by a non-access stratum, or may be obtained by the terminal device from stored historic information.

The SST is configured for indicating a slice type of the target network slice required by the terminal device or a service type corresponding to the slice.

Specifically, the SST of the target network slice corresponds to the service type.

For example, a corresponding relationship between services corresponding to the SST and values of SST may be as shown in table 1:

TABLE 1

Corresponding relationship between services corresponding to the SST and SST values

| Slice/Service type | SST value |
|---|---|
| eMBB | 1 |
| URLLC | 2 |
| MIoT | 3 |
| V2X | 4 |

A12, slice/service type slice differentiator (SST-SD); specifically, the SST-SD may be notified by a non-access stratum, or may be obtained by the terminal device from stored historic information.

A13, single network slice selection assistance information (NSSAI); specifically, the NSSAI may be notified by a non-access stratum, or may be obtained by the terminal device from stored historic information.

Further, the terminal may request information corresponding to the target network slice of a neighboring cell, whilst requesting information corresponding to the target network slice of a serving cell. Specifically, in this case, the request message further includes neighboring cell indication information indicating a neighboring cell of the terminal device; wherein the neighboring cell indication information includes one or more of A21, A22, and A23.

A21, a physical cell identifier (PCI); it is noted that the PCI may be obtained by the terminal device while measuring neighboring cells, in other words, the PCI indicates a cell identifier of a neighboring cell of the terminal device.

A22, a cell global identifier (CGI); it is noted that the CGI may be obtained by the terminal device while measuring neighboring cells, in other words, the CGI indicates a cell identifier of a neighboring cell of the terminal device.

A23, frequency information; specifically, the frequency information includes at least one of following:

A231, a carrier frequency supported by the terminal device; or

A232, a first frequency that is greater than or equal to a first threshold and is searchable by the terminal device.

It is noted, the frequency information is configured for indicating a cell of the terminal device. The cell may be a serving cell and/or a neighboring cell of the terminal device. Usually, the frequency information is configured for indicating a neighboring cell of the terminal device.

In other words, when the request message does not include the neighboring cell indication information indicating the neighboring cell of the terminal device, that is, the terminal does not request, from the network device, a system message or a broadcast message other than a system message that carries information corresponding to one or more target network slices of a neighboring cell of the terminal device required by the terminal device, in this circumstance, the network device only sends a response message of the target network slice, required by the terminal device, of the serving cell of the terminal device. When the request message contains any one or more of A21, A22 and A23, the request message indicates that the terminal device requests, from the network device, information related to the target network slice, required by the terminal device, of a neighboring cell of the terminal device.

It is to be further noted that, because the terminal device requests a serving cell to send information corresponding to the target network slice of a neighboring cell, whilst requesting information corresponding to the target network slice of the serving cell, the terminal device may be aware, in advance, of what services are supported by the neighboring cell, thus avoiding the problem of reselecting a neighboring cell not supporting the service during reselection and causing the terminal device to frequently perform cell handover, thereby improving the accuracy of cell reselection of the terminal device.

In another embodiment of the present application, the information obtaining method further includes:

- determining configuration information corresponding to different network slices, wherein the configuration information includes one or more of a preamble, random access time-frequency resource information, and radio resource control RRC information corresponding to each network slice; and
- determining, according to the configuration information corresponding to the different network slices, configuration information corresponding to the target network slice;
- wherein the sending the request message to the network device includes:
- sending the request message to the network device according to the determined configuration information corresponding to the target network slice.

It is noted, the steps of determining configuration information corresponding to different network slices, the configuration information including one or more of a preamble, random access time-frequency resource information, and radio resource control RRC information corresponding to each network slice, and determining, according to the configuration information corresponding to the different network slices, configuration information corresponding to the target network slice may be a step performed before or during the sending the request message to the network device.

In another embodiment of the present application, the specific implementation of the step S201 may include at least one of following:

Step S2011, determining configuration information corresponding to different network slices, wherein the configuration information includes one or more of a preamble, random access time-frequency resource information, and radio resource control (RRC) information corresponding to each network slice;

It is noted, the configuration information corresponding to different network slices are generally configured by the network device for the terminal device.

Step S2012, determining, according to the configuration information corresponding to the different network slices, configuration information corresponding to the target network slice, and sending the request message to the network device according to the determined configuration information corresponding to the target network slice.

In another embodiment of the present application, in case that the configuration information is the preamble, the sending the request message to the network device according to the determined configuration information corresponding to the target network slice in the step S2012 specifically includes:

- sending the preamble corresponding to the target network slice to the network device.

It is noted, in this case, the preamble is configured for indicating the request message. For example, a slice 1 corresponds to a preamble 1, and in a case that the terminal device sends the preamble 1 to the network device, the preamble 1 indicates that the terminal needs to obtain the broadcast message of the slice 1.

In other words, in this circumstance, the terminal device does not directly send the request message to the network device, but rather indicates the request message through the sent preamble.

In another embodiment of the present application, in case that the configuration information is the random access time-frequency resource information, the sending the request message to the network device according to the determined configuration information corresponding to the target network slice in the step S2012 specifically includes one of following steps B11 and B12.

B11, sending the preamble to the network device on the random access time-frequency resource information corresponding to the target network slice.

In other words, in this case, the terminal device does not directly send the request message to the network device, but rather sends the preamble on the random access time-frequency resource information corresponding to the target network slice, to indicate the request message. For example, a slice 2 corresponds to random access time-frequency resource information 2, and in a case that the terminal device sends the preamble on the random access time-frequency resource information 2, the random access time-frequency resource information 2 indicates that the terminal needs to obtain the broadcast message of the slice 2.

B12, sending the request message to the network device through a random access message MSG3.

Specifically, in this case, the terminal device sends the request message to the network device by means of a random access message 3 (Message 3, MSG3) carrying the request message in a random access procedure.

It is further noted, a specific implementation in this case is: writing the request message into a medium access control control element (MAC CE) of the random access MSG3, and sending the random access MSG3 including the written request message to the network device.

In another embodiment of the present application, in case that the configuration information is the RRC information, the sending the request message to the network device according to the determined configuration information corresponding to the target network slice in the step S2012 specifically includes sending the request message to the network device through the RRC information corresponding to the target network slice.

It is noted that, in this case, the terminal device incorporates the request message into the RRC information corresponding to the target network slice. Specifically, the RRC information may be an RRC system information request (RRCSystemInfoRequest).

In another embodiment of the present application, the configuration information further includes:

first indication information indicating whether a cell where the terminal device currently resides sends a network slice of the neighboring cell of the terminal device; wherein the neighboring cell of the terminal device is determined based on the neighboring cell indication information.

Specifically, that the cell where the terminal device currently resides sends the network slice of the neighboring cell of the terminal device refers to that the current cell has the capability of sending the network slice of the neighboring cell of the terminal device. Specifically, the network slice may be the target network slice currently requested by the terminal device, or other network slice.

Specifically, in this circumstance, for example, in the case that the first indication information indicates that the cell where the terminal device currently resides sends the target network slice of the neighboring cell of the terminal device, the terminal device may incorporate the neighboring cell indication information into the request message, that is, the request message may include any one or more of A21 to A23. In the case that the first indication information indicates that the cell where the terminal device currently resides cannot send the target network slice of the neighboring cell of the terminal device, the terminal device generally does not incorporate the neighboring cell indication information into the request message, that is, the request message does not include A21 to A23.

It is further noted, the information corresponding to the target network slice includes:

second indication information indicating whether a target cell supports the target network slice requested by the terminal device;

wherein the target cell includes at least one of a serving cell of the terminal device or a neighboring cell of the terminal device.

For example, when the request message does not carry the neighboring cell indication information, the response message generally only carries the second indication information indicating whether a serving cell of the terminal device supports the target network slice requested by the terminal device. When the request message carries the neighboring cell indication information, the response message generally carries the second indication information indicating whether a serving cell of the terminal device supports the target network slice requested by the terminal device, and the second indication information indicating whether a neighboring cell of the terminal device supports the target network slice requested by the terminal device.

It is further noted, in case that the second indication information indicates that the target cell supports the target network slice requested by the terminal device, the information corresponding to the target network slice further includes:

a configuration parameter of the target network slice.

Specifically, if the target cell is a serving cell, the response message includes the configuration parameter of the target network slice in the serving cell; if the target cell includes both a serving cell and a neighboring cell, the response message includes the configuration parameter of the target network slice in the serving cell, and the configuration parameter of the target network slice in the neighboring cell.

In another embodiment of the present application, the response message further includes a configuration parameter of a network slice that is supported by the target cell and is different from the target network slice.

It is noted that, the configuration parameter of a network slice that is supported by the target cell and is different from the target network slice may be information included in the response message apart from the information corresponding to the target network slice; or, the configuration parameter of a network slice that is supported by the target cell and is different from the target network slice may be information included in the information corresponding to the target network slice in the response message.

In another embodiment of the present application, the information corresponding to the target network slice may further include: a configuration parameter of a network slice that is supported by the target cell and is different from the target network slice.

It is noted that, the configuration parameter of a network slice that is supported by the target cell and is different from the target network slice is a piece of information in another embodiment of the present application, and the network device may piggyback the parameter on the information corresponding to the target network slice while sending the information corresponding to the target network slice, that is, the terminal can obtain configuration parameters of multiple network slices by making the request once. In this way, interactions between the terminal device and the network device may be reduced, and resource overhead is reduced.

Specifically, after the terminal device obtains the response message sent by the network device, the terminal device may judge, according to the response message, whether to camp in a serving cell, whether to establish an RRC connection, whether to recover an RRC connection establishment, or whether to perform a cell reselection.

It is noted that, in the case that the response message only includes the configuration parameter of the target network slice of the serving cell, the terminal device may judge, according to the configuration parameter, whether to camp in a serving cell, whether to establish an RRC connection, or whether to recover an RRC connection establishment. In the case that the response message includes the configuration parameter of the target network slice of the neighboring cell and further includes the configuration parameter of the target network slice of the neighboring cell, the terminal device may further perform a cell reselection according to the configuration parameter of the target network slice of the neighboring cell.

Specific practical applications of the present disclosure are detailed hereinafter.

Scenario 1, UE reports a request message, to request a first broadcast message of one or more target network slices related to a current serving cell Step 1, the UE determines one or more target network slice parameters corresponding to the required target network slice.

Optionally, the UE may obtain the parameter of the target network slice by reading a message broadcasted by the serving cell.

Step 2, the UE sends a request message to the network side.

Optionally, the UE may send a corresponding preamble on the random access time-frequency resources corresponding to the target network slice.

For example, the UE may send a preamble 1 on the resource 1;

or, the UE incorporates the request message in the MSG3;

or, the UE incorporates the request message in the MAC CE of the MSG3.

For example, the MAC CE includes a mapping relationship. In another embodiment of the present application, as shown in FIG. 3, $SST_m$=1 represents that the UE needs a broadcast message related to $SST_m$. Specifically, $SST_0$ to $SST_7$ in FIG. 3 represent 8 different slices respectively, wherein OCT1 represents octet 1. Optionally, the MAC CE may further include a mapping relationship of a cell identity document (ID) or a frequency, in other words, when the terminal device needs slice information corresponding to a certain cell ID or a frequency, the terminal device correspondingly sets the cell ID or the frequency to 1. For example, as shown in FIG. 4, $PCI_m$=1 represents that the UE needs the broadcast message related to the neighboring cell of the terminal device that corresponds to the $PCI_m$. Specifically, $PCI_0$ to $PCI_7$ in FIG. 4 represent cells corresponding to 8 different physical cell identifiers, respectively. As shown in FIG. 5, $CGI_m$=1 represents that the UE needs the broadcast message related to the neighboring cell of the terminal device that corresponds to the $CGI_m$. Specifically, $CGI_0$ to $CGI_7$ in FIG. 5 represent cells corresponding to 8 different cell global identifiers, respectively. As shown in FIG. 6, $F_m$=1 represents that the UE needs the broadcast message related to the neighboring cell of the terminal device that corresponds to the $F_m$. Specifically, $F_0$ to $F_7$ in FIG. 6 represent 8 pieces of different frequency information, respectively.

Step 3, the network side sends a broadcast message corresponding to the target network slice after receiving the request message sent by the UE.

The broadcast message may include at least one of:

second indication information indicating whether the serving cell supports the target network slice requested by the UE;

configuration parameters of other network slices supported by the serving cell.

If the second indication information indicates that the serving cell supports the target network slice requested by the UE, the broadcast message further includes the configuration parameter of the supported target network slice.

Step 4, after the UE is notified of whether the serving cell supports the target network slice requested by the UE, if the current serving cell supports the target network slice requested by the UE, the UE judges whether to camp in the current cell, whether to establish an RRC connection, or whether to recover an RRC connection establishment.

If the serving cell does not support the target network slice requested by the UE, the UE may opt to reselect another serving cell; if the current serving cell supports the target network slice requested by the UE, the UE may camp in the current serving cell and perform an RRC establishment procedure.

It is further noted that, if the UE does not obtain the target network slice parameter corresponding to the required target network slice, the UE may not send the request message, and the UE may perform cell reselection until one cell supporting the slice service is selected; or, the UE attaches to the current cell, and if a slice service not supported by the current serving cell arrives, after the UE establishes the RRC connection, the serving cell hands over the UE to other cell supporting the slice service through handover.

Scenario 2, UE reports a request message including PCI/CGI of a neighboring cell, to request a broadcast message of the target network slice related to the neighboring cell (an advantage is: since the broadcast message of the neighboring cell is sent by the serving cell, the UE no longer needs to read the broadcast message of the neighboring cell, and can obtain the information of the target network slice of the neighboring cell directly from the stored historic information)

Step 1, the UE obtains configuration information corresponding to the target network slice.

Optionally, the UE may obtain configuration information corresponding to the target network slice of the neighboring cell by reading a broadcast message. The broadcast message may include:

a preamble and/or random access time-frequency resource corresponding to the target network slice, and/or;

RRC information corresponding to the target network slice; for example, the network side configures the random access time-frequency resource corresponding to slice 1 as resource 1 or configures the preamble corresponding to slice 1 as preamble 1; and/or, first indication information indicating whether a current cell broadcasts one or more target network slices of the neighboring cell.

Step 2, the UE obtains, according to the configuration information, the request message and sends it to the network side.

If the current serving cell supports broadcasting the target network slice of the neighboring cell, the UE sends, to the network side, the request message for the target network slice of the neighboring cell.

Specifically, the UE may send PCI and/or CGI to the network side. Optionally, the PCI or CGI may be obtained from historic broadcast messages stored by the UE, or information of serving cells which the UE once camped on, and is configured for representing that the UE requests information of PCI and/or CGI of the neighboring cell. Optionally, the request message may further include information of the target network slice, and/or measurement information, and/or supported service information, e.g., vehicle wireless communication (also called vehicle to everything, V2X) service, industrial Internet of things (IIoT), power saving service information, or the like.

Step 3, the network side sends a requested broadcast message corresponding to the neighboring cell after receiving the request message sent by the UE.

The broadcast message may include:

second indication information indicating whether the neighboring cell of the request supports the target network slice requested by the UE; and/or, configuration parameters of other network slices supported by the neighboring cell of the request; and/or, if the second indication information indicates that the neighboring cell supports the target network slice requested by the UE, the broadcast message further includes the configuration parameter of the target network slice; and/or, whether the neighboring cell of the request supports other service parameters, e.g., V2X service, IIoT, power saving service or the like, and/or parameter information for supporting these services, for example, V2X service parameter and/or IIoT service parameter and/or power saving service parameter or the like of the supported neighboring cell.

Step 4, the UE judges whether to perform reselection to hand over to the neighboring cell after obtaining the information of the neighboring cell.

If the serving cell does not support the service requested by the UE, the UE may opt to reselect to hand over to the neighboring cell supporting the service. For example, if a neighboring cell 1 supports the target network slice, and a neighboring cell 2 does not support the target network slice, then if the UE selects two serving cells, the UE preferentially reselects to hand over to the neighboring cell 1 even if the signal quality of the neighboring cell 1 is inferior to that of the neighboring cell 2.

Scenario 3, UE reports a request message including a central frequency of a neighboring cell, to request a broadcast message of the target network slice related to the neighboring cell (an advantage is: since the broadcast message of the neighboring cell is sent by the serving cell, the UE no longer needs to read the broadcast message of the neighboring cell, and can obtain the information of the target network slice of the neighboring cell directly from the measured central frequency)

Step 1, same as the scenario 2.

Step 2, the UE obtains, according to the configuration information, the request message and sends the same to the network side.

If the current serving cell supports broadcasting the target network slice of the neighboring cell, the UE sends, to the network side, the request message for the target network slice of the neighboring cell.

Specifically, the UE may send, to the network side, frequency information or cell information that is detected by the UE and satisfies a condition of being higher than a first threshold. Optionally, the request message may further include information of the target network slice, and/or measurement configuration information, and/or supported service information, e.g., V2X service, IIoT, power saving service information or the like.

Step 3, the network side sends a requested broadcast message corresponding to the neighboring cell after receiving the request message sent by the UE.

The broadcast message may include:

second indication information indicating whether the cell corresponding to the requested frequency supports the target network slice requested by the UE; and/or, configuration parameters of other network slices supported by the cell corresponding to the requested frequency; and/or, if the second indication information indicates that the cell corresponding to the requested frequency supports the target network slice requested by the UE, the broadcast message further includes the configuration parameter of the target network slice; and/or, whether the cell corresponding to the requested frequency supports other service parameters, e.g., V2X service, IIoT, power saving service or the like, and/or parameter information for supporting these services, for example, V2X service parameter and/or IIoT service parameter and/or power saving service parameter or the like of the cell corresponding to the requested frequency.

Step 4, the UE judges whether to reselect to hand over to the cell after obtaining the information of the cell corresponding to the requested frequency.

If the serving cell does not support the service requested by the UE, the UE may opt to reselect to hand over to the neighboring cell supporting the service. For example, if a neighboring cell 1 supports the target network slice, and a neighboring cell 2 does not support the target network slice, then if the UE selects two serving cells, the UE preferentially reselects to hand over to the neighboring cell 1 even if the signal quality of the neighboring cell 1 is inferior to that of the neighboring cell 2.

It is further noted that, if the UE does not obtain the configuration information of the request message, the UE may not send the request message, and the UE may perform cell reselection until one cell supporting the slice service is selected; or, the UE attaches to the current cell, and if a slice service not supported by the current serving cell arrives, then after the UE establishes the RRC connection, the serving cell hands over the UE to other cell supporting the slice service through handover.

It is noted, the embodiments of the present application send, to a network device, a request message for requesting the information of the target network slice required by the terminal device in an on-demand system information (SI) request procedure, such that the network device sends a corresponding broadcast message according to the request message; and the network device only sends the corresponding broadcast message when the terminal device makes the request. In this way, the problem of broadcasting too many system messages is avoided, thereby reducing the waste of radio resources corresponding to the broadcast messages, and saving radio resources.

The technical solution provided by the embodiments of the present application may be applicable to multiple kinds of systems, especially a 5G system. For example, an applicable system may be a global system of mobile communication (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a long term evolution advanced (LTE-A) system, a universal mobile telecommunication system (UMTS) system, a worldwide interoperability for microwave access (WiMAX) system, a 5G New Radio (NR) system, or the like. All of the multiple kinds of systems include a terminal device and a network device. The systems may include a core network portion as well, for example, evolved packet system (EPS), 5G system (5GS) or the like.

The terminal device involved in the embodiments of the present application may be a device that provides voice and/or data connectivity to a user, a handheld device with a radio connection function, or other processing devices connected to a radio modem or the like. In different systems, the names of terminal devices may be different. For example, in a 5G system, a terminal device may be called user equipment (UE). Wireless terminal device can communicate with one or more core networks (CNs) via a radio access network (RAN), and wireless terminal device may be a mobile terminal device, such as a mobile phone (or called “cellular” phone) and computer with a mobile terminal device, such as portable, pocket-sized, hand-held, computer built-in or vehicle-mounted mobile apparatuses, which exchange voice and/or data with the radio access network. For example, personal communication service (PCS) phones, cordless phones, session initiated protocol (SIP) phones, wireless local loop (WLL) stations, personal digital assistant (PDA), and other devices. The wireless terminal device may also be called a system, subscriber unit, subscriber station, mobile station, mobile, remote station, access point, remote terminal, access terminal, user terminal, user agent, and user device, which are not limited in the embodiments of the present application.

The network device involved in the embodiments of the present application may be a base station. The base station may include multiple cells that provide services to terminals. Depending on the specific application scenario, the base station may be called an access point, or may be a device in the access network that communicates over an air interface with wireless terminal devices through one or more sectors, or may be called other name. The network device may be used for converting the received radio frames into Internet protocol (IP) packets or vice versa, and serves as a router between the wireless terminal devices and the rest of the access network. The rest of the access network may include an IP communication network. The network device may also coordinate the attribute management of the air interface. For example, the network device involved in the embodiments of the present application may be a base transceiver station (BTS) in the global system for mobile communications (GSM) or code division multiple access (CDMA), a NodeB in the wide-band code division multiple access (WCDMA), an evolved Node B (eNB or e-NodeB) in Long Term Evolution (LTE) system, a 5G base station (gNB) in 5G network architecture (next generation system), a home evolved Node B (HeNB), a relay node, a femto base station, a pico base station, or the like, which is not limited herein. In some network architectures, the network device may include a centralized unit (CU) node and a distributed unit (DU) node, which may be located geographically separated.

The network device and the terminal device may perform multi-input multi-output (MIMO) transmission with each other by using one or more antennas. The MIMO transmission may be single user MIMO (SU-MIMO) or multiple user MIMO (MU-MIMO). According to the configuration and quantity of antenna combinations, the MIMO transmission may be two-dimension MIMO (2D-MIMO), three-dimension MIMO (3D-MIMO), full-dimension MIMO (FD-MIMO) or massive-MIMO, and may be diversity transmission, precoded transmission, beam forming transmission, or the like.

As shown in FIG. 7, an embodiment of the present application provides an information sending method. The method is performed by a network device and includes:

Step S701, receiving a request message sent by a terminal device, the request message being used for requesting information of one or more target network slices required by the terminal device;

Step S702, determining information corresponding to the target network slice according to the request message; and Step S703, sending a response message to the terminal device, the response message carrying the information corresponding to the target network slice.

The request message includes a parameter of the target network slice;

wherein the parameter of the target network slice includes one or more of following:

slice/service type (SST), slice/service type slice differentiator (SST-SD), single network slice selection assistance information (NSSAI).

In another embodiment of the present application, before the step S701, the method further includes:

sending configuration information corresponding to different network slices to the terminal device;

wherein the configuration information includes one or more of a preamble, random access time-frequency resource information, and radio resource control RRC information corresponding to each network slice.

Further, a specific implementation of the step 702 is:

obtaining the target network slice according to the request message;

determining whether a serving cell of the terminal device supports the target network slice; and determining that second indication information indicating whether the serving cell of the terminal device supports the target network slice as the information corresponding to the target network slice.

It is noted that, in this implementation, the network device obtains, according to the request message, the target network slice requested by the terminal device, and then judges whether the serving cell of the terminal device supports the target network slice, so as to obtain the second indication information indicating whether the serving cell of the terminal device supports the target network slice, thereby piggybacking, in the response message while sending the response message, the second indication information indicating whether the serving cell of the terminal device supports the target network slice.

It is further noted that, in case that the second indication information indicates that the serving cell of the terminal device supports the target network slice, the response message sent by the network device also needs to carry the configuration parameter of the target network slice supported by the serving cell, that is, the information corresponding to the target network slice also needs to include the configuration parameter of the target network slice supported by the serving cell.

It is further noted that, if the terminal device sends the request message in a manner, then the network device receives the request message correspondingly according to the manner of sending.

In another embodiment of the present application, in case that the configuration information is the preamble, the receiving the request message sent by the terminal device according to the configuration information includes:

receiving the preamble corresponding to the target network slice sent by the terminal device.

In another embodiment of the present application, in case that the configuration information is the random access time-frequency resource information, the receiving the request message sent by the terminal device according to the configuration information includes:

receiving the preamble sent by the terminal device on the random access time-frequency resource information corresponding to the target network slice;

or, receiving the request message sent by the terminal device in a random access message MSG3.

In another embodiment of the present application, the receiving the request message sent by the terminal device in the random access message MSG3 includes:

receiving the random access message MSG3 sent by the terminal device; and obtaining the request message from a medium access control control element (MAC CE) of the random access message MSG3.

In another embodiment of the present application, in case that the configuration information is the RRC information, the receiving the request message sent by the terminal device according to the configuration information includes:

receiving the request message sent by the terminal device in the RRC information corresponding to the target network slice.

In another embodiment of the present application, the request message further includes neighboring cell indication information indicating a neighboring cell of the terminal device;

wherein the neighboring cell indication information includes one or more of:

a physical cell identifier (PCI), a cell global identifier (CGI), and frequency information.

In another embodiment of the present application, the frequency information includes one or more of following:

a carrier frequency supported by the terminal device;

a first frequency that is greater than or equal to a first threshold and is searchable by the terminal device.

It is further noted that, in case that the request message further includes neighboring cell indication information, a specific implementation of the step 702 further includes:

obtaining the target network slice according to the request message;

determining whether a neighboring cell of the terminal device corresponding to the neighboring cell indication information supports the target network slice; and determining that second indication information indicating whether the neighboring cell of the terminal device supports the target network slice is the information corresponding to the target network slice.

It is noted, in this implementation, the network device obtains the neighboring cell of the terminal device according to the request message, and then judges whether the neighboring cell of the terminal device supports the target network slice, so as to obtain the second indication information indicating whether the neighboring cell of the terminal device supports the target network slice, thereby piggybacking, in the response message while sending the response message, the second indication information indicating whether the neighboring cell of the terminal device supports the target network slice.

It is further noted that, in case that the second indication information indicates that the neighboring cell of the terminal device supports the target network slice, the response message sent by the network device also needs to carry the configuration parameter of the target network slice supported by the neighboring cell, that is, the information corresponding to the target network slice also needs to include the configuration parameter of the target network slice supported by the neighboring cell.

In another embodiment of the present application, the information corresponding to the target network slice may further include: a configuration parameter of a network slice that is supported by the target cell and is different from the target network slice;

wherein the target cell includes at least one of a serving cell of the terminal device or a neighboring cell of the terminal device.

It is noted that, all descriptions related to the network device side in the aforementioned embodiments are applicable to the embodiment of the information sending method, and can achieve the same technical effects.

Figure 8:
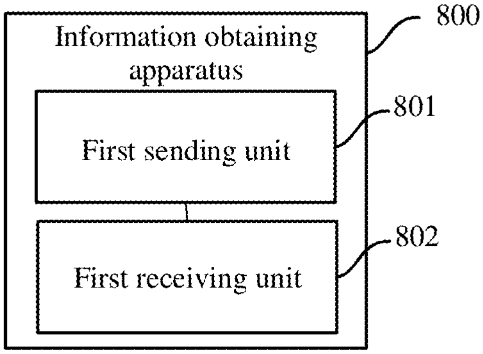
FIG. 8 is a schematic block diagram of an information obtaining apparatus according to an embodiment of the present application.

As shown in FIG. 8, an embodiment of the present application provides an information obtaining apparatus 800, including:

a first sending unit 801, configured to send a request message to a network device, the request message being used for requesting information of one or more target network slices required by a terminal device; and a first receiving unit 802, configured to receive a response message sent by the network device, the response message carrying information corresponding to the target network slice.

In another embodiment of the present application, the request message includes a parameter of the target network slice;

wherein the parameter of the target network slice includes one or more of following:

slice/service type SST, slice/service type slice differentiator SST-SD, single network slice selection assistance information NSSAI.

In another embodiment of the present application, the information obtaining apparatus 800 further includes:

a first determining module, configured to determine configuration information corresponding to different network slices, wherein the configuration information includes one or more of a preamble, random access time-frequency resource information, and radio resource control RRC information corresponding to each network slice; and a second determining module, configured to determine, according to the configuration information corresponding to the different network slices, configuration information corresponding to the target network slice;

wherein the first sending unit 801 is specifically configured to:

send the request message to the network device according to the determined configuration information corresponding to the target network slice.

It is noted that, the first determining module and the second determining module may be modules in the information obtaining apparatus 800 other than the first sending unit 801, or may be modules included in the first sending unit 801.

In another embodiment of the present application, the first sending unit 801 is specifically configured to:

determine configuration information corresponding to different network slices, wherein the configuration information includes one or more of a preamble, random access time-frequency resource information, and radio resource control RRC information corresponding to each network slice;

determine, according to the configuration information corresponding to the different network slices, configuration information corresponding to the target network slice; and send the request message to the network device according to the determined configuration information corresponding to the target network slice.

In another embodiment of the present application, in case that the configuration information is the preamble, a specific implementation of sending the request message to the network device according to the determined configuration information corresponding to the target network slice is:

sending the preamble corresponding to the target network slice to the network device.

In another embodiment of the present application, in case that the configuration information is the random access time-frequency resource information, a specific implementation of sending the request message to the network device according to the determined configuration information corresponding to the target network slice is:

sending the preamble to the network device on the random access time-frequency resource information corresponding to the target network slice;

or, sending the request message to the network device through a random access message MSG3.

In another embodiment of the present application, the sending the request message to the network device through the random access message MSG3 specifically includes:

writing the request message into a medium access control control element MAC CE of the random access message MSG3, and sending the random access message MSG3 including the written request message to the network device.

In another embodiment of the present application, in case that the configuration information is the RRC information, the sending the request message according to the configuration information includes:

sending the request message to the network device through the RRC information corresponding to the target network slice.

In another embodiment of the present application, the request message further includes neighboring cell indication information indicating a neighboring cell of the terminal device;

wherein the neighboring cell indication information includes one or more of:

a physical cell identifier PCI, a cell global identifier CGI, and frequency information.

In another embodiment of the present application, the frequency information includes one or more of following:

a carrier frequency supported by the terminal device;

a first frequency that is greater than or equal to a first threshold and is searchable by the terminal device.

In another embodiment of the present application, the configuration information further includes:

first indication information indicating whether a cell where the terminal device currently resides sends a network slice of the neighboring cell of the terminal device;

wherein the neighboring cell of the terminal device is determined based on the neighboring cell indication information.

In another embodiment of the present application, the information corresponding to the target network slice includes:

second indication information indicating whether a target cell supports the target network slice requested by the terminal device;

wherein the target cell includes at least one of a serving cell of the terminal device or a neighboring cell of the terminal device.

In another embodiment of the present application, the response message further includes: a configuration parameter of a network slice that is supported by the target cell and is different from the target network slice.

In another embodiment of the present application, the information corresponding to the target network slice further includes:

a configuration parameter of a network slice that is supported by the target cell and is different from the target network slice.

In another embodiment of the present application, in case that the second indication information indicates that the target cell supports the target network slice requested by the terminal device, the information corresponding to the target network slice further includes:

a configuration parameter of the target network slice.

In another embodiment of the present application, after the first receiving unit 802 receives the response message sent by the network device, the apparatus further includes:

a processing unit, configured to judge, according to the response message, whether to camp in a serving cell, whether to establish an RRC connection, whether to recover an RRC connection establishment, or whether to perform cell reselection.

It is noted, the apparatus embodiments are in one-to-one correspondence with the embodiments of the information obtaining method applied to the terminal device side, and all implementations of the method embodiments are applicable to the embodiments of the apparatus, and can achieve the same technical effects.

It should be noted that the division of units in the embodiments of the present application is illustrative, and is only a logical function division, and there may be another division method in actual implementation. In addition, the functional units in various embodiments of the present application may be integrated into one processing unit, or each unit may exist separately physically, or two or more units may be integrated into one unit. The above-mentioned integrated units can be implemented in the form of hardware or in the form of software functional units.

If the integrated unit is implemented in the form of a software function unit and sold or used as an independent product, it can be stored in a processor-readable storage medium. Based on such an understanding, essential parts, or parts contributing to the related art, of the technical solution of the present disclosure, or all or a part of the technical solution may be implemented in a form of a software product. The computer software product is stored in a storage medium, and includes several instructions to enable a computer device (which may be a personal computer, a server, or a network device, etc.) or a processor to execute all or part of the steps of the methods described in the various embodiments of the present disclosure. The aforementioned storage media include: a universal serial bus (USB) flash drive, removable hard disk, read-only memory (ROM), random access memory (RAM), magnetic disk, optical disc or other media that can store program codes.

Figure 9:
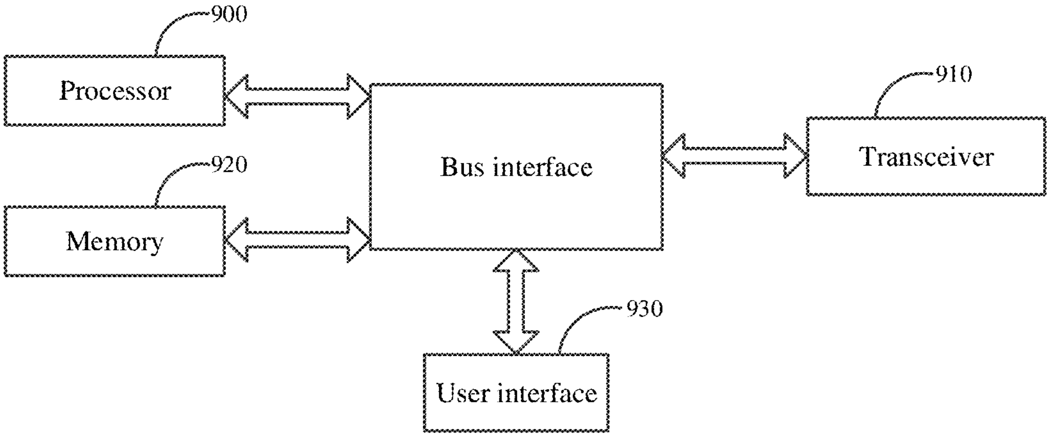
FIG. 9 is a structural diagram of a terminal device according to an embodiment of the present application.

As shown in FIG. 9, an embodiment of the present application further provides a terminal device, including a processor 900, a transceiver 910, a memory 920 and a program stored in the memory 920 and executable by the processor 900, wherein the transceiver 910 is connected to the processor 900 and the memory 920 through a bus interface, and the processor 900 is configured for reading the program in the memory to implement following steps:

sending, through the transceiver 910, a request message to a network device, the request message being used for requesting information of one or more target network slices required by the terminal device; and receiving, through the transceiver 910, a response message sent by the network device, the response message carrying information corresponding to the target network slice.

The transceiver 910 is configured for receiving and sending data under the control of the processor 900.

In FIG. 9, a bus architecture may include any number of interconnected buses and bridges, and connects various circuits including one or more processors represented by the processor 900 and memory represented by the memory 920.

The bus architecture may also connect various other circuits such as peripherals, voltage regulators and power management circuits, which is well known in the art. Therefore, a detailed description thereof is omitted herein. A bus interface provides an interface. The transceiver 910 may be multiple elements, i.e., a transmitter and a receiver, to allow for communication with various other apparatuses on the transmission medium. These transmission medium includes wireless channel, wired channel, optic fiber or the like. For different user equipment, the user interface 930 may be an interface capable of externally or internally connecting a required device, and the connected device includes, but is not limited to: a keypad, a display, a speaker, a microphone, a joystick and the like.

The processor 900 is responsible for supervising the bus architecture and normal operation, and the memory 920 may store the data being used by the processor 900 during operation.

Optionally, the processor 900 may be a central processing unit (CPU), an application specific integrated circuit (ASIC), a field-programmable gate array (FPGA) or a complex programmable logic device (CPLD). The processor may also adopt a multi-core architecture.

The processor invokes a computer program stored in the memory and implements any one method provided in the embodiments of the present application according to the obtained executable instructions. The processor and the memory may also be arranged physically separately.

In another embodiment of the present application, the request message includes a parameter of the target network slice;

wherein the parameter of the target network slice includes one or more of following:

slice/service type SST, slice/service type slice differentiator SST-SD, single network slice selection assistance information NSSAI.

In another embodiment of the present application, the processor is configured for reading the computer program in the memory to implement following steps:

determining configuration information corresponding to different network slices, wherein the configuration information includes one or more of a preamble, random access time-frequency resource information, and radio resource control RRC information corresponding to each network slice;

determining, according to the configuration information corresponding to the different network slices, configuration information corresponding to the target network slice; and sending, through the transceiver, the request message to the network device according to the determined configuration information corresponding to the target network slice.

In another embodiment of the present application, in case that the configuration information is the preamble, the processor is configured for reading the computer program in the memory to implement following steps:

sending, through the transceiver, the preamble corresponding to the target network slice to the network device.

In another embodiment of the present application, in case that the configuration information is the random access time-frequency resource information, the processor is configured for reading the computer program in the memory to implement following steps:

sending, through the transceiver, the preamble to the network device on the random access time-frequency resource information corresponding to the target network slice;

or, sending, through the transceiver, the request message to the network device through a random access message MSG3.

In another embodiment of the present application, the processor is configured for reading the computer program in the memory to implement following steps:

writing the request message into a medium access control control element MAC CE of the random access message MSG3, and sending the random access message MSG3 including the written request message to the network device.

In another embodiment of the present application, in case that the configuration information is the RRC information, the processor is configured for reading the computer program in the memory to implement following step:

sending, through the transceiver, the request message to the network device through the RRC information corresponding to the target network slice.

In another embodiment of the present application, the request message further includes neighboring cell indication information indicating a neighboring cell of the terminal device;

wherein the neighboring cell indication information includes one or more of:

a physical cell identifier PCI, a cell global identifier CGI, and frequency information.

In another embodiment of the present application, the frequency information includes one or more of following:

a carrier frequency supported by the terminal device;

a first frequency that is greater than or equal to a first threshold and is searchable by the terminal device.

In another embodiment of the present application, the configuration information further includes:

first indication information indicating whether a cell where the terminal device currently resides sends a network slice of the neighboring cell of the terminal device; wherein the neighboring cell of the terminal device is determined based on the neighboring cell indication information.

In another embodiment of the present application, the information corresponding to the target network slice includes:

second indication information indicating whether a target cell supports the target network slice requested by the terminal device;

wherein the target cell includes at least one of a serving cell of the terminal device or a neighboring cell of the terminal device.

In another embodiment of the present application, the information corresponding to the target network slice further includes:

a configuration parameter of a network slice that is supported by the target cell and is different from the target network slice.

In another embodiment of the present application, in case that the second indication information indicates that the target cell supports the target network slice requested by the terminal device, the information corresponding to the target network slice further includes:

a configuration parameter of the target network slice.

In another embodiment of the present application, the processor is configured for reading the computer program in the memory to further implement following step:

judging, according to the response message, whether to camp in a serving cell, whether to establish an RRC connection, whether to recover an RRC connection establishment, or whether to perform a cell reselection.

It is noted that, the terminal device according to the embodiments of the present application can implement all method steps implemented by the aforementioned method embodiments, and can achieve the same technical effects. A detailed description of a part of these embodiments that is same as the method embodiments and its beneficial effects are omitted herein.

The present application further provides in an embodiment a computer readable storage medium storing a computer program, wherein the computer program is configured to be executed by a processor to implement the steps of the information obtaining method applied to the terminal device. The processor readable storage medium may be any available medium or data storage device that can be accessed by the processor, including but not limited to magnetic storage (such as floppy disk, hard disk, magnetic tape, magneto-optical disk (MO)), optical storage (such as compact disc (CD), digital versatile disc (DVD), blue-ray disc (BD), high-definition versatile disc (HVD)), and semiconductor memory (such as ROM, electrically programmable ROM (EPROM), electrically erasable programmable ROM (EEPROM), non-volatile memory (NAND FLASH), solid-state drive (SSD)), etc.

Figure 10:
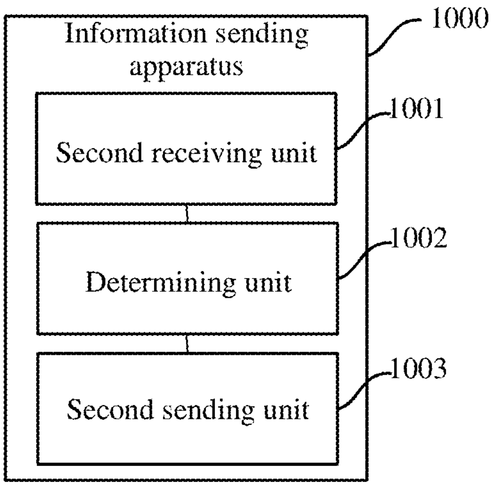
FIG. 10 is a schematic block diagram of an information sending apparatus according to an embodiment of the present application.

As shown in FIG. 10, an embodiment of the present application provides an information sending apparatus 1000, including:

a second receiving unit 1001, configured to receive a request message sent by a terminal device, the request message being used for requesting information of one or more target network slices required by the terminal device;

a determining unit 1002, configured to determine information corresponding to the target network slice according to the request message; and a second sending unit 1003, configured to send a response message to the terminal device, the response message carrying the information corresponding to the target network slice.

In another embodiment of the present application, the request message includes a parameter of the target network slice;

wherein the parameter of the target network slice includes one or more of following:

slice/service type SST, slice/service type slice differentiator SST-SD, single network slice selection assistance information NSSAI.

In another embodiment of the present application, the apparatus 1000 further includes:

a third sending unit, configured to, before the second receiving unit 1001 receiving the request message sent by the terminal device, send configuration information corresponding to different network slices to the terminal device;

wherein the configuration information includes one or more of a preamble, random access time-frequency resource information, and radio resource control RRC information corresponding to each network slice.

In another embodiment of the present application, the determining unit 1002 is specifically configured to implement:

obtaining the target network slice according to the request message;

determining whether a serving cell of the terminal device supports the target network slice; and determining that second indication information indicating whether the serving cell of the terminal device supports the target network slice is the information corresponding to the target network slice.

In another embodiment of the present application, the request message further includes neighboring cell indication information indicating a neighboring cell of the terminal device;

wherein the neighboring cell indication information includes one or more of:

a physical cell identifier PCI, a cell global identifier CGI, and frequency information.

In another embodiment of the present application, the frequency information includes one or more of following:

a carrier frequency supported by the terminal device;

a first frequency that is greater than or equal to a first threshold and is searchable by the terminal device.

In another embodiment of the present application, the determining unit 1002 is specifically configured to implement:

obtaining the target network slice according to the request message;

determining whether a neighboring cell of the terminal device corresponding to the neighboring cell indication information supports the target network slice; and determining that second indication information indicating whether the neighboring cell of the terminal device supports the target network slice is the information corresponding to the target network slice.

It is noted that, the apparatus embodiments are in one-to-one correspondence with the embodiments of the information sending method applied to the network device side, and all implementations of the method embodiments are applicable to the embodiments of the apparatus, and can achieve the same technical effects.

It should be noted that the division of units in the embodiments of the present application is illustrative, and is only a logical function division, and there may be another division method in actual implementation. In addition, the functional units in various embodiments of the present application may be integrated into one processing unit, or each unit may exist separately physically, or two or more units may be integrated into one unit. The above-mentioned integrated units can be implemented in the form of hardware or in the form of software functional units.

If the integrated unit is implemented in the form of a software function unit and sold or used as an independent product, it can be stored in a processor-readable storage medium. Based on such an understanding, essential parts, or parts contributing to the related art, of the technical solution of the present disclosure, or all or a part of the technical solution may be implemented in a form of a software product. The computer software product is stored in a storage medium, and includes several instructions to enable a computer device (which may be a personal computer, a server, or a network device, etc.) or a processor to execute all or part of the steps of the methods described in the various embodiments of the present application. The aforementioned storage media include: a universal serial bus (USB) flash drive, removable hard disk, read-only memory (ROM), random access memory (RAM), magnetic disk, optical disc or other media that can store program codes.

Figure 11:
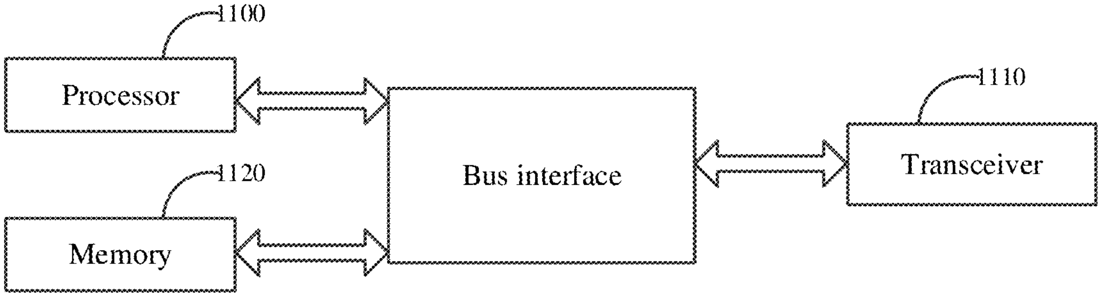
FIG. 11 is a structural diagram of a network device according to an embodiment of the present application.

As shown in FIG. 11, an embodiment of the present application further provides a network device, including a processor 1100, a transceiver 1110, a memory 1120 and a program stored in the memory 1120 and executable by the processor 1100, wherein the transceiver 1110 is connected to the processor 1100 and the memory 1120 through a bus interface, and the processor 1100 is configured for reading the program in the memory to implement following steps:

receiving, through the transceiver 1110, a request message sent by a terminal device, the request message being used for requesting information of one or more target network slices required by the terminal device;

determining information corresponding to the target network slice according to the request message; and sending, through the transceiver 1110, a response message to the terminal device, the response message carrying information corresponding to the target network slice.

The transceiver 1110 is configured for receiving and sending data under the control of the processor 1100.

In FIG. 11, a bus architecture may include any number of interconnected buses and bridges, and connects various circuits including one or more processors represented by the processor 1100 and memory represented by the memory 1120. The bus architecture may also connect various other circuits such as peripherals, voltage regulators and power management circuits, which is well known in the art. Therefore, a detailed description thereof is omitted herein. A bus interface provides an interface. The transceiver 1110 may be multiple elements, i.e., a transmitter and a receiver, to allow for communication with various other apparatuses on the transmission medium. These transmission medium includes wireless channel, wired channel, optic fiber or the like. The processor 1100 is responsible for supervising the bus architecture and normal operation, and the memory 1120 may store the data being used by the processor 1100 during operation.

The processor 1100 may be a central processing unit (CPU), an application specific integrated circuit (ASIC), a field-programmable gate array (FPGA) or a complex programmable logic device (CPLD). The processor may also adopt a multi-core architecture.

In another embodiment of the present application, the request message includes a parameter of the target network slice;

wherein the parameter of the target network slice includes one or more of following:

slice/service type SST, slice/service type slice differentiator SST-SD, single network slice selection assistance information NSSAI.

In another embodiment of the present application, the processor is configured for reading the computer program in the memory to implement following step:

sending, through the transceiver, configuration information corresponding to different network slices to the terminal device;

wherein the configuration information includes one or more of a preamble, random access time-frequency resource information, and radio resource control RRC information corresponding to each network slice.

In another embodiment of the present application, the processor is configured for reading the computer program in the memory to implement following steps:

obtaining the target network slice according to the request message;

determining whether a serving cell of the terminal device supports the target network slice; and determining that second indication information indicating whether the serving cell of the terminal device supports the target network slice is the information corresponding to the target network slice.

In another embodiment of the present application, the request message further includes neighboring cell indication information indicating a neighboring cell of the terminal device;

wherein the neighboring cell indication information includes one or more of:

a physical cell identifier PCI, a cell global identifier CGI, and frequency information.

In another embodiment of the present application, the frequency information includes one or more of following:

a carrier frequency supported by the terminal device;

a first frequency that is greater than or equal to a first threshold and is searchable by the terminal device.

In another embodiment of the present application, the processor is configured for reading the computer program in the memory to implement following steps:

obtaining the target network slice according to the request message;

determining whether a neighboring cell of the terminal device corresponding to the neighboring cell indication information supports the target network slice; and determining that second indication information indicating whether the neighboring cell of the terminal device supports the target network slice is the information corresponding to the target network slice.

It is noted that, the network device according to the embodiments of the present application can implement all method steps implemented by the aforementioned method embodiments, and can achieve the same technical effects. A detailed description of a part of these embodiments that is same as the method embodiments and its beneficial effects are omitted herein.

The present application further provides in an embodiment a computer readable storage medium storing a computer program, wherein the computer program is configured to be executed by a processor to implement the steps of the information sending method applied to the network device. The processor readable storage medium may be any available medium or data storage device that can be accessed by the processor, including but not limited to magnetic storage (such as floppy disk, hard disk, magnetic tape, magneto-optical disk (MO)), optical storage (such as compact disc (CD), digital versatile disc (DVD), blue-ray disc (BD), high-definition versatile disc (HVD)), and semiconductor memory (such as ROM, electrically programmable ROM (EPROM), electrically erasable programmable ROM (EEPROM), non-volatile memory (NAND FLASH), solid-state drive (SSD)), etc.

A person skilled in the art can understand that embodiments of the present application may be provided as a method, system, or computer program product. Accordingly, the present application may take the form of an entirely hardware embodiment, an entirely software embodiment, or an embodiment combining software and hardware aspects. Furthermore, the present application may take the form of a computer program product configured to be implemented on one or more computer-usable storage media (including but not limited to disk storage, optical storage, etc.) storing computer-usable program codes therein.

The present application is described with reference to flowcharts and/or block diagrams of methods, devices (systems), and computer program products according to the embodiments of the application. It will be understood that each process and/or block in the flowcharts and/or block diagrams, and combinations of processes and/or blocks in the flowcharts and/or block diagrams, can be implemented by computer executable instructions. These computer executable instructions may be provided to the processor of a general-purpose computer, special purpose computer, embedded processor or other programmable data processing device to produce a machine, such that the instructions executed by the processor of the computer or other programmable data processing device produce an apparatus for implementing the functions specified in one or more processes in the flowcharts and/or one or more blocks in the block diagrams.

These processor-executable instructions may also be stored in a processor-readable storage capable of directing a computer or other programmable data processing device to operate in a specific manner, such that the instructions stored in the processor-readable storage produce an article of manufacture including instruction means, the instruction means implements the functions specified in one or more processes of the flowchart and/or one or more blocks of the block diagram.

These processor-executable instructions can also be loaded onto a computer or other programmable data processing device, so that a series of operational steps can be performed on the computer or other programmable device to produce a computer-implemented process, the instructions executed on the computer or other programmable devices thus provide steps for realizing the functions specified in one or more processes of the flowchart and/or one or more blocks of the block diagram.

It should be noted that the division of modules is only a logical function division, and in actual implementation, all or some of the modules may be integrated on one physical entity, or may be physically separated. All these modules may be implemented by a software invoked by a processing element, or implemented by a hardware. Alternatively, some of these modules may be implemented by software invoked by a processing element, and some of these modules may be implemented by hardware. For example, a module may be a standalone processing element, or may be integrated in a certain chip of the foregoing apparatuses. In addition, the module may be stored in the memory of the foregoing apparatuses in form of program codes, and is invoked by a certain processing element of the foregoing apparatuses to implement the function of the determining module. Other modules may be implemented in a similar way. In addition, all or some of these modules may be integrated together, or may be implemented independently. The processing element may be a kind of integrated circuit having a signal processing capability. In implementation, various steps of the method or the various modules can be implemented through hardware integrated logic circuits in the processor element or instructions in the form of software.

For example, the various modules, units, sub-units or sub-modules may be one or more integrated circuits configured to implement the foregoing methods, e.g., one or more ASICs, one or more digital signal processors (DSPs), one or more FPGAs, or the like. For another example, when a certain module is implemented by program codes invoked by a processing element, the processing element may be a general-purpose processor, e.g., a CPU or other processor capable of invoking program codes. For yet another example, these modules may be integrated together and implemented in the form of a system-on-a-chip (SOC).

Terms "first", "second" and the like in the specification and claims of this application are adopted not to describe a specific sequence or order but to distinguish similar objects. It should be understood that terms used like this may be interchanged under a proper condition for implementation of the embodiments of the present disclosure described here in a sequence apart from those shown or described here. In addition, terms "include" and "have" and any variant thereof are intended to cover nonexclusive inclusions. For example, a process, method, system, product or equipment including a series of steps or units is not limited to those steps or units which are clearly listed, but may include other steps or units which are not clearly listed or intrinsic to the process, the method, the product or the equipment. In addition, the term "and/or" as used in the description and claims refers to at least one of objects connected by the term, for example, A and/or B and/or C represents seven possibilities: only A exists, only B exists, only C exists, both A and B exist, both B and C exist, both A and C exist, and all of A, B and C exist. Similarly, the expression "at least one of A or B" used in the description and claims should be construed as "only A exists, only B exists, or both A and B exist".

Obviously, modifications and improvements may be made by a person of ordinary skill in the art without departing from the spirit and scope of the present disclosure, and these modifications and improvements shall be encompassed by the present disclosure if the modifications and improvements fall within the scope of the claims of the present disclosure and equivalents thereof.

What is claimed is:

1. An information obtaining method, performed by a terminal device, comprising:

sending a request message to a network device, the request message being used for requesting information of one or more target network slices required by the terminal device; and receiving a response message sent by the network device, the response message carrying information corresponding to the one or more target network slices;

wherein the information corresponding to the one or more target network slices comprises:

second indication information indicating whether a target cell supports the one or more target network slices requested by the terminal device;

wherein the target cell comprises at least one of a serving cell of the terminal device or a neighboring cell of the terminal device;

wherein the request message comprises one or more parameters of the one or more target network slices;

wherein each of the one or more parameters of the one or more target network slices comprises one or more of following:

a slice/service type SST, a slice/service type slice differentiator SST-SD, single network slice selection assistance information NSSAI;

the method further comprising:

determining configuration information corresponding to different network slices, wherein the configuration information comprises one or more of a preamble, random access time-frequency resource information, and radio resource control RRC information corresponding to each network slice; and determining, according to the configuration information corresponding to the different network slices, configuration information corresponding to the one or more target network slices;

wherein the sending the request message to the network device comprises:

sending the request message to the network device according to the determined configuration information corresponding to the one or more target network slices.

2. The information obtaining method according to claim 1, wherein, in case that the configuration information is the preamble, the sending the request message to the network device according to the determined configuration information corresponding to the one or more target network slices specifically comprises:

sending one or more preambles corresponding to the one or more target network slices to the network device;

and/or wherein, in case that the configuration information is the random access time-frequency resource information, the sending the request message to the network device according to the determined configuration information corresponding to the one or more target network slices specifically comprises:

sending a preamble to the network device on the random access time-frequency resource information corresponding to the one or more target network slices;

or, sending the request message to the network device through a random access message MSG3;

and/or wherein, in case that the configuration information is the RRC information, the sending the request message to the network device according to the determined configuration information corresponding to the one or more target network slices comprises:

sending the request message to the network device through the RRC information corresponding to the one or more target network slices.

3. The information obtaining method according to claim 2, wherein in case that the configuration information is the random access time-frequency resource information, the sending the request message to the network device through the random access message MSG3 specifically comprises:

writing the request message into a medium access control control element MAC CE of the random access message MSG3, and sending the random access message MSG3 comprising the written request message to the network device.

4. The information obtaining method according to claim 1, wherein the request message further comprises neighboring cell indication information indicating a neighboring cell of the terminal device;

wherein the neighboring cell indication information comprises one or more of following:

a physical cell identifier PCI, a cell global identifier CGI, and frequency information.

5. The information obtaining method according to claim 4, wherein the frequency information comprises one or more of following:

a carrier frequency supported by the terminal device;

a first frequency that is greater than or equal to a first threshold and is searchable by the terminal device.

6. The information obtaining method according to claim 4, wherein the configuration information further comprises:

first indication information indicating whether a cell where the terminal device currently resides sends a network slice of a neighboring cell of the terminal device;

wherein the neighboring cell of the terminal device is determined based on the neighboring cell indication information.

7. The information obtaining method according to claim 1, wherein the information corresponding to the target network slice further comprises:

a configuration parameter of a network slice that is supported by the target cell and is different from the one or more target network slices.

8. The information obtaining method according to claim 1, wherein, in case that the second indication information indicates that the target cell supports the one or more target network slices requested by the terminal device, the information corresponding to the one or more target network slices further comprises:

one or more configuration parameters of the one or more target network slices.

9. The information obtaining method according to claim 1, wherein, after the receiving the response message sent by the network device, the method further comprises:

judging, according to the response message, whether to camp in a serving cell, whether to establish an RRC connection, whether to recover an RRC connection establishment, or whether to perform cell reselection.

10. An information sending method, performed by a network device, comprising:

receiving a request message sent by a terminal device, the request message being used for requesting information of one or more target network slices required by the terminal device;

determining information corresponding to the one or more target network slices according to the request message; and sending a response message to the terminal device, the response message carrying the information corresponding to the one or more target network slices;

wherein the information corresponding to the one or more target network slices comprises:

second indication information indicating whether a target cell supports the one or more target network slices requested by the terminal device;

wherein the target cell comprises at least one of a serving cell of the terminal device or a neighboring cell of the terminal device;

wherein the request message comprises one or more parameters of the one or more target network slices;

wherein each of the one or more parameters of the one or more target network slices comprises one or more of following:

a slice/service type SST, a slice/service type slice differentiator SST-SD, single network slice selection assistance information NSSAI;

wherein, before the receiving the request message sent by the terminal device, the method further comprises:

sending configuration information corresponding to different network slices to the terminal device;

wherein the configuration information comprises one or more of a preamble, random access time-frequency resource information, and radio resource control RRC information corresponding to each network slice.

11. The information sending method according to claim 10, wherein the determining the information corresponding to the one or more target network slices according to the request message comprises:

obtaining the one or more target network slices according to the request message;

determining whether a serving cell of the terminal device supports the one or more target network slices; and determining that second indication information indicating whether the serving cell of the terminal device supports the one or more target network slices is the information corresponding to the one or more target network slices.

12. The information sending method according to claim 10, wherein the request message further comprises neighboring cell indication information indicating a neighboring cell of the terminal device;

wherein the neighboring cell indication information comprises one or more of following:

a physical cell identifier PCI, a cell global identifier CGI, and frequency information.

13. The information sending method according to claim 12, wherein the determining the information corresponding to the one or more target network slices according to the request message comprises:

obtaining the one or more target network slices according to the request message;

determining whether a neighboring cell of the terminal device corresponding to the neighboring cell indication information supports the one or more target network slices; and determining that second indication information indicating whether the neighboring cell of the terminal device supports the one or more target network slices is the information corresponding to the one or more target network slices.

14. A terminal device, comprising:

a memory, a transceiver and a processor, wherein, the memory is configured for storing a computer program; the transceiver is configured for transmitting and receiving data under control of the processor; and the processor is configured for reading the computer program in the memory to implement following steps:

sending, through the transceiver, a request message to a network device, the request message being used for requesting information of one or more target network slices required by the terminal device; and receiving, through the transceiver, a response message sent by the network device, the response message carrying information corresponding to the one or more target network slices;

wherein the information corresponding to the one or more target network slices comprises:

second indication information indicating whether a target cell supports the one or more target network slices requested by the terminal device;

wherein the target cell comprises at least one of a serving cell of the terminal device or a neighboring cell of the terminal device;

wherein the request message comprises one or more parameters of the one or more target network slices;

wherein each of the one or more parameters of the one or more target network slices comprises one or more of following:

a slice/service type SST, a slice/service type slice differentiator SST-SD, single network slice selection assistance information NSSAI;

wherein the processor is configured for reading the computer program in the memory to further implement following steps:

determining configuration information corresponding to different network slices, wherein the configuration information comprises one or more of a preamble, random access time-frequency resource information, and radio resource control RRC information corresponding to each network slice; and determining, according to the configuration information corresponding to the different network slices, configuration information corresponding to the one or more target network slices;

wherein the sending the request message to the network device comprises:

sending the request message to the network device according to the determined configuration information corresponding to the one or more target network slices.

15. A network device, comprising:

a memory, a transceiver and a processor, wherein, the memory is configured for storing a computer program; the transceiver is configured for transmitting and receiving data under a control of the processor; and the processor is configured for reading the computer program in the memory to implement steps of the method according to claim 10.

* * * * *